(12) United States Patent
Vaideeswaran

(10) Patent No.: US 11,467,923 B2
(45) Date of Patent: Oct. 11, 2022

(54) APPLICATION RECOVERY USING POOLED RESOURCES

(71) Applicant: Kyndryl, Inc., New York, NY (US)

(72) Inventor: Rajagopal Vaideeswaran, Tamilnadu (IN)

(73) Assignee: Kyndryl, Inc., New York, NY (US)

( * ) Notice: Subject to any disclaimer, the term of this patent is extended or adjusted under 35 U.S.C. 154(b) by 661 days.

(21) Appl. No.: 16/412,624

(22) Filed: May 15, 2019

(65) Prior Publication Data

US 2020/0364116 A1 Nov. 19, 2020

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 2009/45575* (2013.01); *G06F 2201/815* (2013.01)

(58) Field of Classification Search
CPC ............. G06F 11/1469; G06F 9/45558; G06F 2009/45575; G06F 2201/815; G06F 2009/45579; G06F 11/1484
USPC .......................................................... 714/19
See application file for complete search history.

(56) References Cited

U.S. PATENT DOCUMENTS

| | | | |
|---|---|---|---|
| 9,189,338 B2 | 11/2015 | Akirav et al. | |
| 9,430,337 B1 | 8/2016 | Gupta et al. | |
| 9,477,555 B1 | 10/2016 | Hagan et al. | |
| 10,042,710 B2 | 8/2018 | Mutalik et al. | |
| 2011/0214010 A1 | 9/2011 | Aggarwal et al. | |
| 2013/0080823 A1 | 3/2013 | Roth et al. | |
| 2013/0179729 A1* | 7/2013 | Chiu | G06F 12/16 707/649 |
| 2013/0185716 A1* | 7/2013 | Yin | G06F 16/1794 718/1 |
| 2015/0039930 A1 | 2/2015 | Babashetty et al. | |
| 2015/0331753 A1 | 11/2015 | Nakajima et al. | |
| 2017/0139791 A1 | 5/2017 | Hagan et al. | |
| 2017/0185488 A1* | 6/2017 | Kumarasamy | G06F 11/2038 |
| 2017/0371696 A1* | 12/2017 | Prziborowski | G06F 9/45558 |

OTHER PUBLICATIONS

Wikipedia configuration file page from date May 5, 2019, retrieved from https://web.archive.org/web/20190505065701/https://en.wikipedia.org/wiki/Configuration_file (Year: 2019).*

(Continued)

*Primary Examiner* — Yair Leibovich
(74) *Attorney, Agent, or Firm* — Ken Han; Andrew M. Calderon; Calderon Safran & Cole, P.C.

(57) ABSTRACT

In a first virtual storage device managed by a helper virtual machine, first data of a first application is stored, the first application executing on a first system, the helper virtual machine executing on a recovery system. Responsive to determining that a duplicate of the first application should be activated on the recovery system, a compute instance is spawned in a hypervisor executing on the recovery system. In the compute instance, a duplicate of the first application is provisioned. The first data is reassociated from the helper virtual machine to the provisioned duplicate application. The duplicate application is activated, the activating causing the duplicate application to execute on the second system using the first data.

20 Claims, 11 Drawing Sheets

(56) References Cited

OTHER PUBLICATIONS

Wikipedia virtual machine page, retrieved from https://en.wikipedia.org/wiki/Virtual_machine (Year: 2022).*
Wikipedia failover page, retrieved from https://en.wikipedia.org/wiki/Failover (Year: 2022).*
Red Hat, Red Hat Virtualiation: VMware Migration, 2016.

* cited by examiner

APPLICATION RECOVERY USING POOLED RESOURCES

TECHNICAL FIELD

The present invention relates generally to a method, system, and computer program product for application recovery. More particularly, the present invention relates to a method, system, and computer program product for application recovery using pooled resources.

BACKGROUND

Disaster recovery for a business's Information Technology (IT) systems typically includes provisions to support critical business functions in the event of a disruption to normal operations. A disruption to normal operations can occur as a result of an event affecting a particular geographic area, such as an earthquake or a hurricane, and for many other reasons. A disruption to normal operations can also occur as a result of an event affecting only one data center (e.g. a localized power failure) or only one system within a data center (e.g. a system power supply failure).

In any disruption, however, one of the goals is typically to restore normal operations as quickly as possible, while using resources efficiently both during backup and recovery. A recovery time objective (RTO) is a time duration within which an operation or process must be restored to a defined service level after a disaster or other disruption in order to avoid unacceptable consequences associated with a break in functional continuity of applications.

Some common strategies for data protection and recovery include: periodic backups that are sent off-site at regular intervals, data replication to an off-site location, cloud-based solutions that replicate system management data off-site for recovery when required, cloud-based solutions that replicate hardware on-site for instant fail-over but can be brought up off-site when required, and cloud-based solutions that keep both the data and system replicated off-site, enabling continuous access to systems and data, even after a disruption.

Each strategy involves a tradeoff between resource usage and recovery time. At one extreme, periodic backups consume minimal resources, but can take hours or even days to complete a restoration of normal operations after a failure. At the other extreme, duplicating a complete data center at another site, including all executing applications and the ability to serve clients from either site, consumes twice the resources required for normal operations, but normal operations are never interrupted.

SUMMARY

The illustrative embodiments provide a method, system, and computer program product. An embodiment includes a method that stores, in a first virtual storage device managed by a helper virtual machine, first data of a first application, the first application executing on a first system, the helper virtual machine executing on a recovery system. An embodiment spawns, responsive to determining that a duplicate of the first application should be activated on the recovery system, a compute instance in a hypervisor executing on the recovery system. An embodiment provisions, in the compute instance, a duplicate of the first application. An embodiment reassociates the first data from the helper virtual machine to the provisioned duplicate application. An embodiment activates the duplicate application, the activating causing the duplicate application to execute on the second system using the first data.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
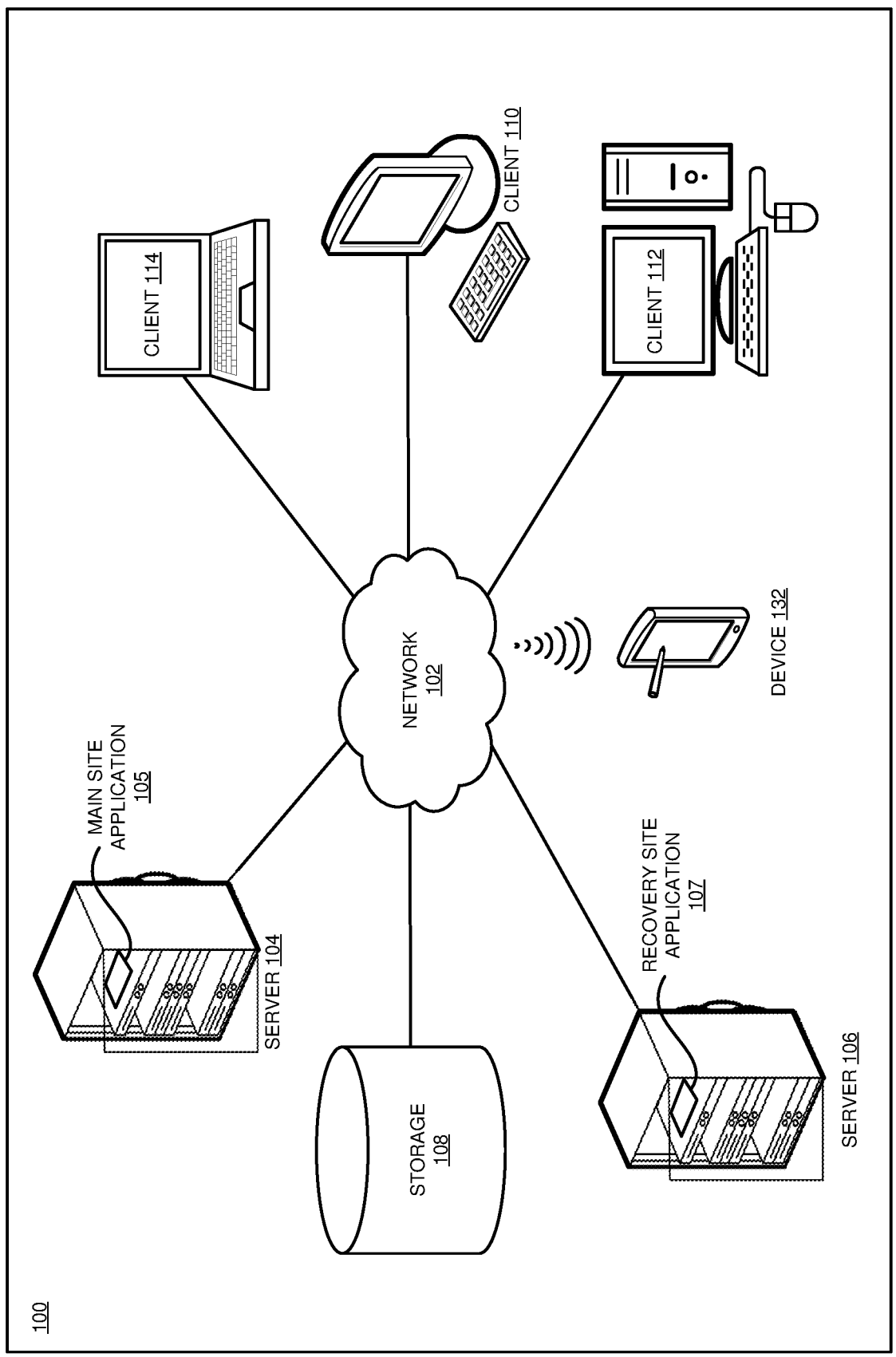
FIG. 1 depicts a block diagram of a network of data processing systems in which illustrative embodiments may be implemented.

The illustrative embodiments recognize that one solution to disruption recovery is to use a symmetric configuration. In a symmetric configuration, there is a one to one correspondence between computing resources at a main site and a recovery site. In other words, for every application that is executing at a main site using a particular configuration of computing and storage resources, an equivalent set of resources is dedicated for use by a duplicate application ready to assume client service from the recovery site. In particular, for every main site compute being used, an equivalent compute at the recovery site must be ready for use, with dedicated resources. As used herein, a compute, or compute instance, refers to an instance of a computing resource, either physical or virtual. A non-limiting example of a physical compute is a server system. A non-limiting example of a virtual compute is a virtual machine. A virtual machine (VM) is an emulation of a computer system. A virtual machine is a software application that emulates a physical computer, running an operating system and applications. A hypervisor is an application that creates, manages, and executes one or more VMs.

Using a symmetric configuration, the duplicate application can substitute for the main site application in about 5-60 seconds, as is typically required for mission-critical applications. However, a symmetric configuration is also inefficient and costly, requiring a business to allocate and pay for additional dedicated resources that may rarely be needed.

The illustrative embodiments recognize that another disruption recovery solution is to duplicate only the data of a main site application. Then, when recovery is necessary, a system administrator can enable appropriate resources and begin execution of the application at the recovery site, using the duplicate data. However, spawning a compute, attaching the replicated data to the compute, and bringing up the application using the duplicated data can take an undesirably long time to be an acceptable solution for mission-critical applications. In particular, the time from main site failure to having a duplicate application available at the recovery site can be five to fifteen minutes, while mission-critical applications typically require one minute or less. In addition, configuring the application to execute at the recovery site often requires a human system administrator to perform at least some steps in the process, which also consumes additional time and adds opportunity for human error.

Consequently, the illustrative embodiments recognize that there is a need for an application disaster recovery solution that requires fewer resources than a symmetric configuration but provides equivalent recovery time.

The illustrative embodiments recognize that the presently available tools or solutions do not address these needs or provide adequate solutions for these needs. The illustrative embodiments used to describe the invention generally address and solve the above-described problems and other problems related to application recovery using pooled resources.

An embodiment can be implemented as a software application. The application implementing an embodiment can be configured as a modification of an existing hypervisor or server management system, as a separate application that operates in conjunction with an existing hypervisor or server management system, a standalone application, or some combination thereof.

Particularly, some illustrative embodiments provide a method by which a helper VM, at a recovery site, can be used to manage data replicated from an executing application. In addition, the helper VM facilitates resource allocation and application recovery at the recovery site. A helper VM, as used herein, is a VM that comprises application data replication and management services for an embodiment.

Each application executing on a system, such as a hypervisor installed on a server in a data center, executes using one or more VMs. Application data for an application includes, for each VM the application uses, a virtual machine configuration file. A virtual machine configuration file describes the configuration of a VM in sufficient detail to allow that VM to be recreated at a different site. The configuration information includes, for example, the operating system being used, the number of storage resources and the size of each storage resource. Application data for an application also includes, for each VM the application uses, at least one virtual disk characteristics file and at least one virtual machine data disk file. A virtual disk characteristics file describes the characteristics of a virtual storage device for a VM, and a virtual machine data disk file contains the contents of a virtual storage device for a VM. Thus, duplicating a virtual disk characteristics file and a virtual machine data disk file effectively duplicates the data stored for that VM.

As used herein, a main site refers to a system in a data center that requires a disruption recovery solution. A recovery site refers to a system in a data center that provides the disruption recovery solution for the main site. The main site and recovery site may be co-located in the same data center, or in geographically separated data centers. A recovery site can support more than one main site, and a main site can send data to more than one recovery site. A main site may also act as a recovery site, for mutual support. A main site may also act as a recovery site, once a disruption to an original main site has been resolved and operations are resuming at the original main site. In addition, a disruption recovery solution can be used whether or not an actual disruption in operations has occurred.

An embodiment on a main site (main site embodiment) enables the later recovery of an application executing on the main site. To enable the later recovery, the main site embodiment sends application data to a recovery site. The application data includes, for each VM the application uses, a virtual machine configuration file, a virtual disk characteristics file, and a virtual machine data disk file. A main site embodiment copies application data as the data moves to and from virtual storage, and sends the copied data. One embodiment, which executes neither in the main site nor the recovery site, but at a third location, such as but not limited to the hypervisor or a third compute node, intercepts the data at the main site and copies the application data to the replication site.

An embodiment on a recovery site (recovery site embodiment) configures a helper VM to store application data of one or more applications. The helper VM executes on a recovery site, and the applications execute on one or more main sites. In particular, the stored application data includes a virtual machine configuration file for the application. The stored application data also includes a virtual disk characteristics file and a virtual machine data disk file for each virtual disk the application uses at the main site. In other words, the helper VM is attached to, or associated with, at least one virtual disk characteristics file and at least one a virtual machine data disk file for each application the helper VM supports. The application may use more than one VM, and each VM includes at least one virtual disk. The helper VM stores application data in file form to avoid having to reformat the application data during disruption recovery.

A recovery site embodiment determines that an application should be transitioned to executing on the recovery site. An embodiment can make the transition determination using a signal from the main site, for example a communication that there is a disruption to a particular application, to all applications using a particular hardware system, or to all applications executing at the main site. Another embodiment can make the transition determination using a lack of communication from the main site, for example a lack of reception of application data for a predetermined time, a reception of application data with an error rate above a predetermined threshold error rate, or a lack of reception of a periodic signal for a predetermined time. In addition, a system administrator can trigger an embodiment to perform the application transition. Another embodiment can make the transition determination for another reason.

To transition the application, a recovery site embodiment uses information in a virtual machine configuration file stored for the application to spawn at least one compute. Each compute is a VM having the same configuration as the original main site application.

Once any necessary compute has been successfully spawned, an embodiment detaches a virtual disk characteristics file and a virtual machine data disk file for the application from the helper VM, and attaches the files to the new compute. The embodiment then activates the duplicate application at the recovery site. The duplicate application now services requests just as the application did from the main site before the transition.

Once the duplicate application is executing at the recovery site, a recovery site embodiment signals a main site embodiment that the duplicate application is executing. At this point, if the main site application is still operating, a main site embodiment is configurable to terminate the execution of the main site application and release the main site application's resources back to a common pool of resources available for use. A main site embodiment is also configurable to keep the main site application executing instead, thus making two copies (one at the main site, one at the recovery site) of the application available for use.

Because the necessary configuration files are already maintained in immediately usable form at the recovery site, an application can be transitioned to the recovery site in one minute or less rather than five to fifteen minutes. However, duplicate resources, such as computes and storage, do not have to be permanently allocated to the application at the recovery site, or paid for by the application owner. As well, the same helper VM can hold application data for multiple applications, avoiding the need to keep duplicate resources for each application separately provisioned and available for immediate switchover.

For example, assume a helper VM replicates and stores data for fifteen applications using one operating system and fifteen applications using a second operating system. Before a disruption occurs, the recovery site needs only the single helper VM, not thirty dedicated VMs to support the thirty applications. If five of each group of fifteen applications are mission-critical and brought up on the recovery site when needed, only eleven total VMs are now needed at the recovery site. Alternatively, the mission-critical applications can be provisioned as a symmetric configuration at the recovery site, or a combination of the recovery site and another site. In addition, if the mission-critical applications are switched back to the main site, ten of the VMs can be released back to the compute and storage pool, leaving only the helper VM.

An embodiment is also usable to transition the application from the recovery site back to the main site. For example, once the main site has recovered from the disruption, a system administrator may prefer that an application return to executing on the main site, for geographic proximity, efficient resource usage, or another reason.

To perform the switchback to the main site, a recovery site embodiment sends application data to the main site. A main site embodiment configures a helper VM to store duplicate application data of one or more applications that are to be switched back to the main site. When a main site embodiment determines that an application should be transitioned to executing on the main site, in a manner described herein, the main site embodiment uses information in a virtual machine configuration file stored for the application to spawn at least one compute. The main site embodiment detaches a virtual disk characteristics file and a virtual machine data disk file for the application from the helper VM, and attaches the files to the new compute. The embodiment then activates the duplicate application at the main site. The application now services requests from the main site just as the application did from the recovery site before the transition. Once the duplicate application is executing at the main site, a main site embodiment signals a recovery site embodiment that the duplicate application is executing. At this point, a recovery site embodiment is configurable to terminate the execution of the recovery site application and release the recovery site application's resources back to a common pool of resources available for use.

An embodiment is also usable to transition the application from the main site to multiple recovery sites concurrently. For example, a system administrator can use the embodiment to efficiently configure several duplicate data centers, then each data center can proceed to service its own set of clients.

A main site embodiment or an embodiment operating at the main site is described as operating at the main site using the main site resources only as an easy-to-understand non-limiting example. Without departing the scope of the illustrative embodiments, such an embodiment can be configured to operate on a companion system of the main site, i.e., on a system that is not used for operating the application from the main site, but a system that can be configured with the main site to provide ancillary services to the main site, including deploying such an embodiment.

Similarly, a recovery site embodiment or an embodiment operating at the recovery site is described as operating at the recovery site using the recovery site resources only as an easy-to-understand non-limiting example. Without departing the scope of the illustrative embodiments, such an embodiment can be configured to operate on a companion system of the recovery site, i.e., on a system that is not used for operating the application from the recovery site, but a system that can be configured with the recovery site to provide ancillary services to the recovery site, including deploying such an embodiment.

The manner of application recovery using pooled resources described herein is unavailable in the presently available methods in the technological field of endeavor pertaining to disruption recovery. A method of an embodiment described herein, when implemented to execute on a device or data processing system, comprises substantial advancement of the functionality of that device or data processing system in using a helper VM at a recovery site to manage data replicated from an executing application and facilitates resource allocation and application recovery at the recovery site.

The illustrative embodiments are described with respect to certain types of VMs, helper VMs, computes, resources, application data, application data files, sites, periods, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
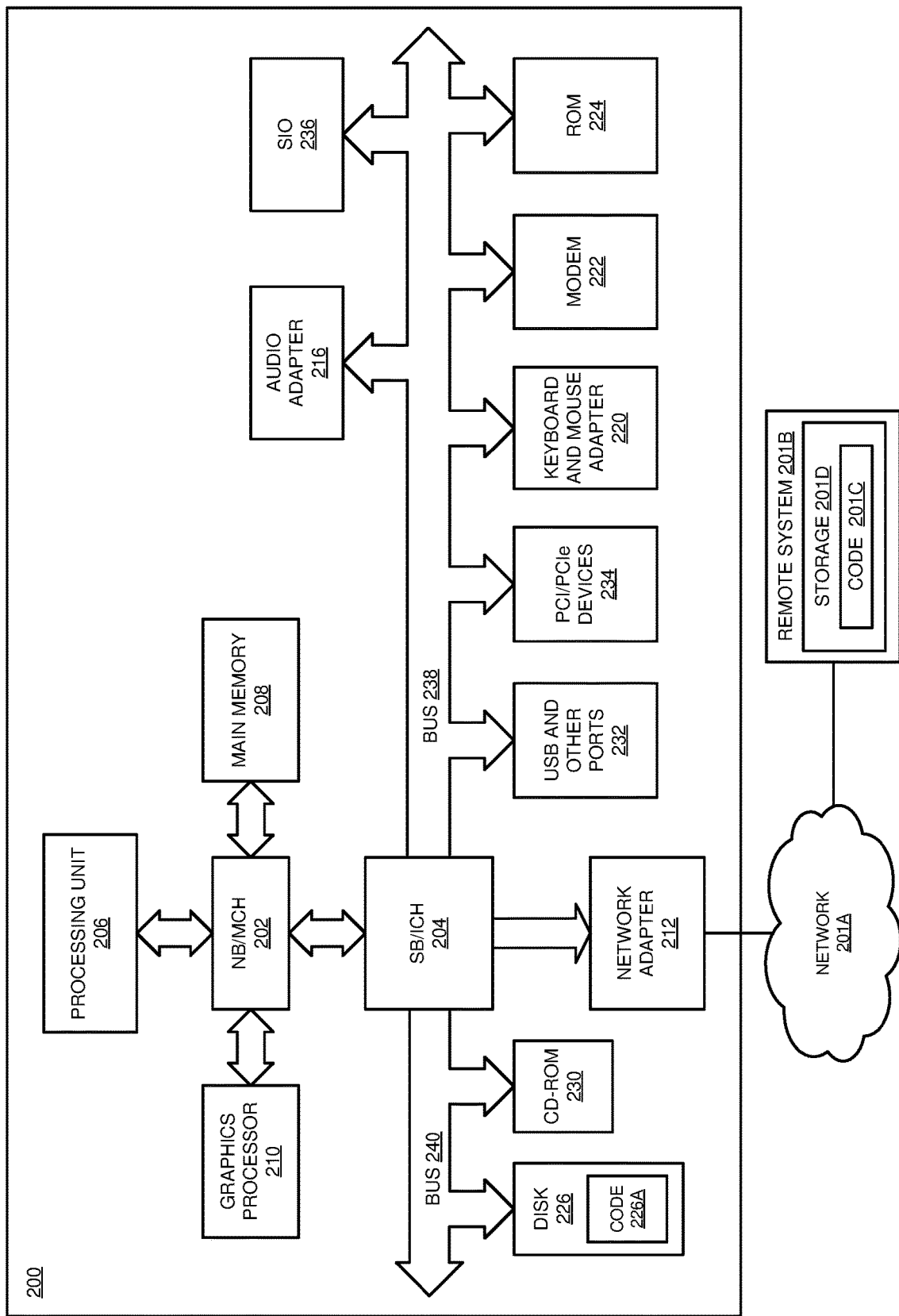
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Main site application 105 implements a main site embodiment described herein, in which server 104 is considered a main site. Recovery site application 107 implements a recovery site embodiment described herein, in which server 106 is considered a recovery site. However, any of servers 104 and 106, clients 110, 112, and 114, and device 132 can function as a main site or recovery site on which either of main site application 105 or recovery site application 107 can execute.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
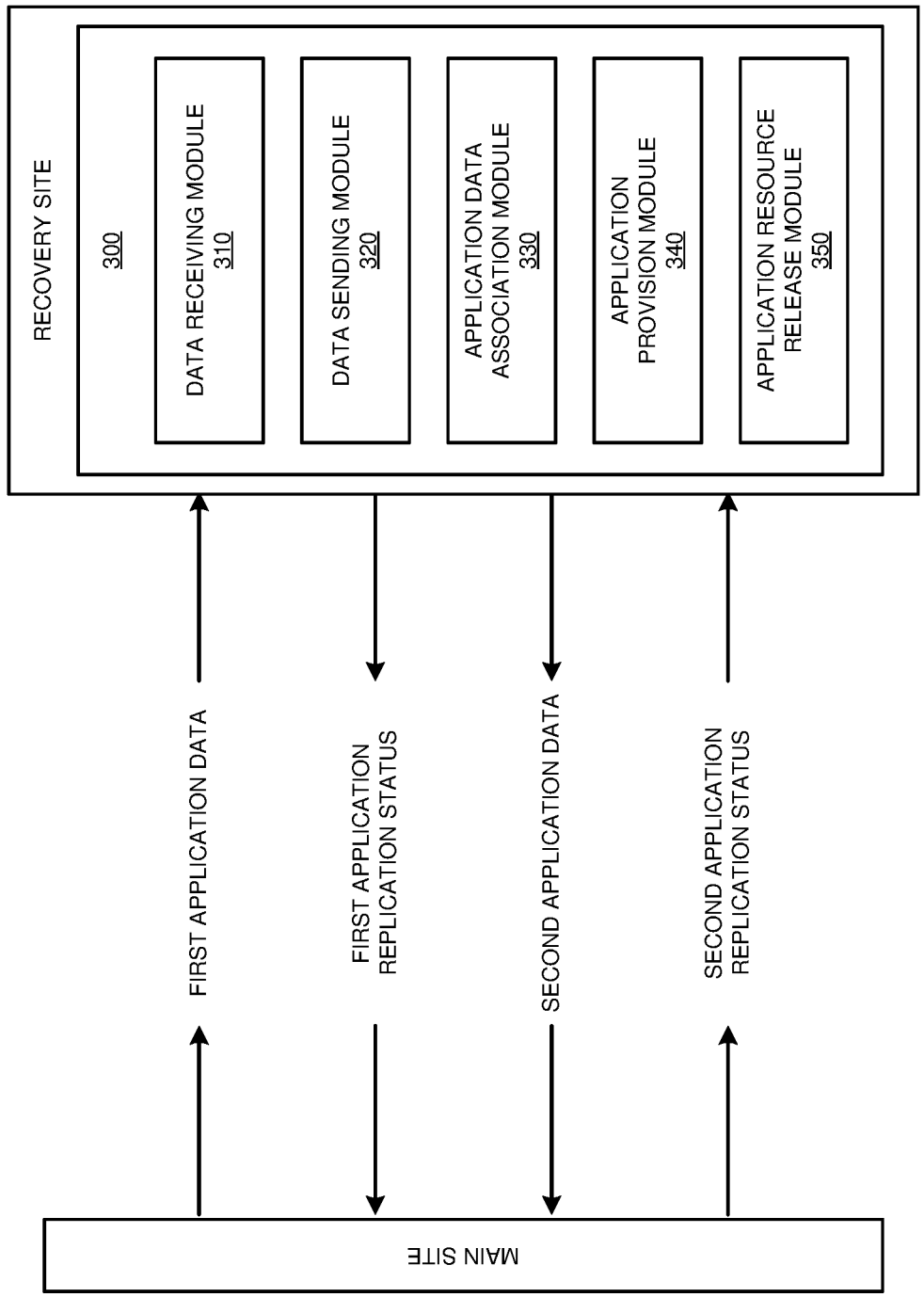
FIG. 3 depicts a block diagram of an example configuration for application recovery using pooled resources in accordance with an illustrative embodiment.

With reference to FIG. 3, this figure depicts a block diagram of an example configuration for application recovery using pooled resources in accordance with an illustrative embodiment. Application 300 is an example of recovery site application 107 in FIG. 1 and executes in any of servers 104 and 106, clients 110, 112, and 114, and device 132 in FIG. 1.

When application 300 acts as the destination of an application to be transitioned or duplicated at another site (e.g. during a switchover operation), data receiving module 310 configures a helper VM to store received application data of one or more applications executing at a source site. The application data includes a virtual machine configuration file for the application and a virtual disk characteristics file and a virtual machine data disk file for each virtual disk the transitioning application uses.

When application 300 determines that an application should be transitioned to executing on the recovery site, application provision module 340 uses information in a virtual machine configuration file stored for the application to spawn at least one compute. Each compute is a VM having the same configuration as the original main site application.

Once any necessary compute has been successfully spawned, application data association module 330 detaches a virtual disk characteristics file and a virtual machine data disk file for the application from the helper VM, and attaches the files to the new compute. Application 300 then activates the duplicate application at the recovery site. The duplicate application now services requests just as the application did from the main site before the transition. Application 300 also signals the main site that the duplicate application is executing.

When, instead, application 300 acts as the source of an application to be transitioned or duplicated at another site (e.g. during a switchback operation), data sending module 320 sends application data to another site. The application data includes, for each VM the application uses, a virtual machine configuration file, a virtual disk characteristics file, and a virtual machine data disk file. To obtain the application data, module 320 intercepts and copies the application data in the hypervisor.

When, during a switchback operation, application 300 receives a signal that the application has successfully transitioned back to the main site, application resource release module 350 terminates the execution of the recovery site application and releases the recovery site application's resources back to a common pool of resources available for use.

Figure 4:
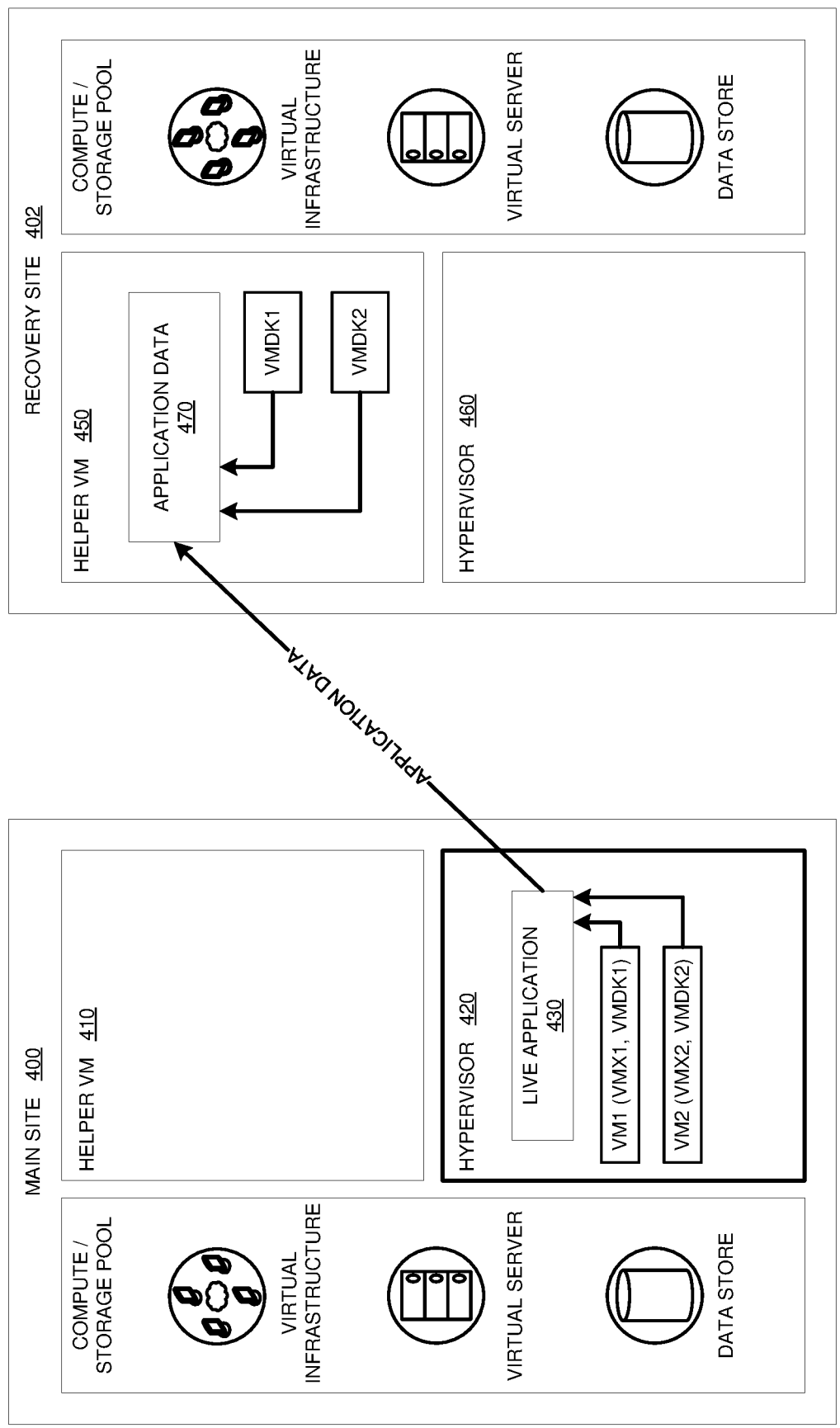
FIG. 4 depicts an example of application recovery using pooled resources in accordance with an illustrative embodiment.

With reference to FIG. 4, this figure depicts an example of application recovery using pooled resources in accordance with an illustrative embodiment. The example can be implemented using application 300 in FIG. 3.

FIG. 4 depicts main site 400 and recovery site 402 during normal operation, before any disruption has occurred. Main site 400 hosts hypervisor 420, in which live application 430 is executing. Live application 430 executes using two VMs, VM1 and VM2. Application data for each VM includes a virtual machine configuration file (VMX1, VMX2) and a virtual disk characteristics file and a virtual machine data disk file (together, VMDK1 and VMDK2). Main site 400 also hosts helper VM 410, for use when an application is to be switched back to main site 400.

As shown, hypervisor 420 sends application data of live application 430 to helper VM 450 on recovery site 402. Helper VM 450 stores application data 470. In particular, helper VM 450 is attached to both VMDK1 and VMDK2, the virtual disk files duplicated from those of live application 430. Recovery site 402 also hosts hypervisor 460.

Figure 5:
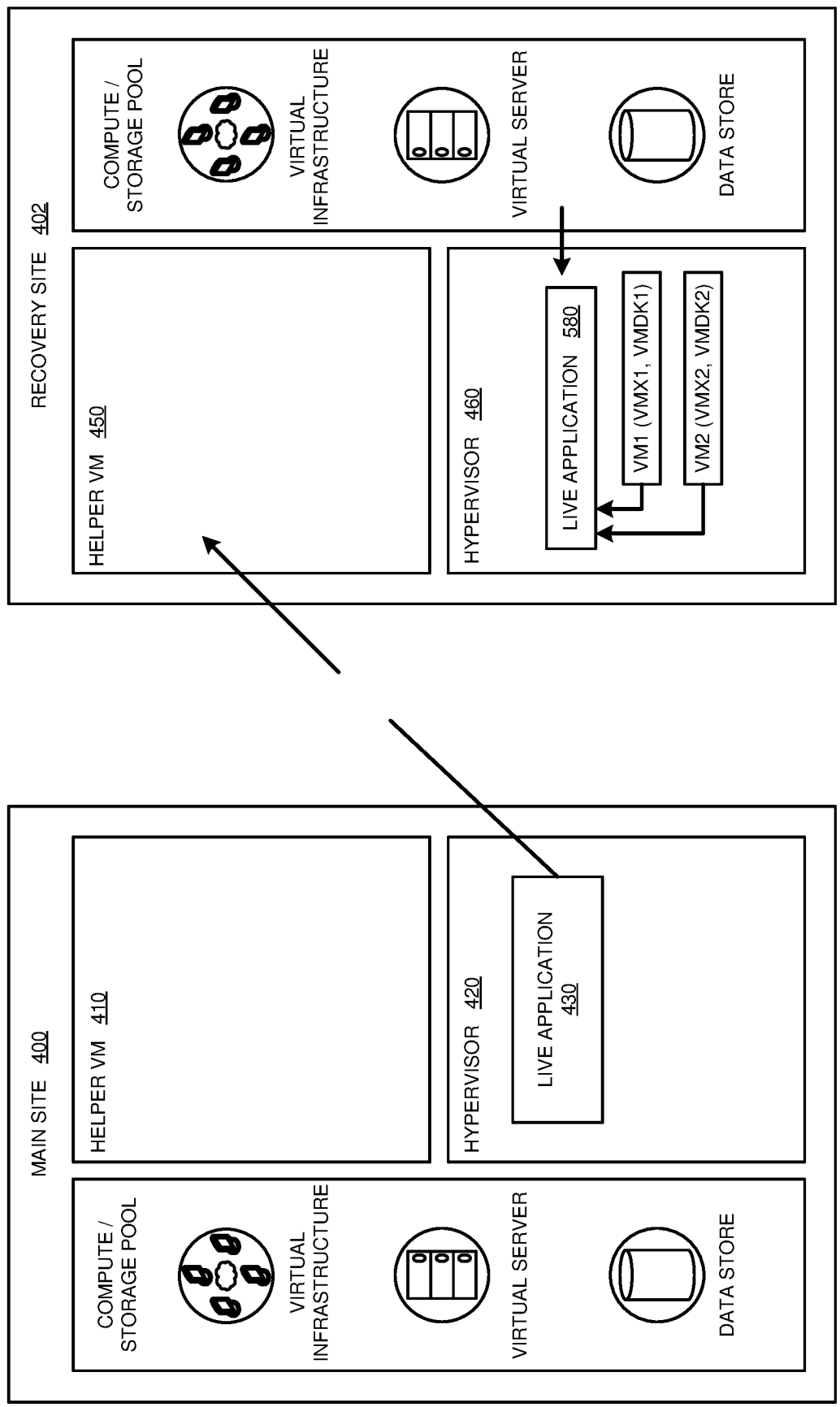
FIG. 5 depicts a continuing example of application recovery using pooled resources in accordance with an illustrative embodiment.

With reference to FIG. 5, this figure depicts a continuing example of application recovery using pooled resources in accordance with an illustrative embodiment. Main site 400, helper VM 410, hypervisor 420, live application 430, recovery site 402, helper VM 450, and hypervisor 460, are the same as main site 400, helper VM 410, hypervisor 420, live application 430, recovery site 402, helper VM 450, and hypervisor 460 in FIG. 4. The example can be implemented using application 300 in FIG. 3.

FIG. 5 depicts main site 400 and recovery site 402 reacting to a disruption of normal operation. The flow of application data from main site 400 to recovery site 402 has been interrupted, although live application 430 may still be executing. Consequently, hypervisor 460 has spawned two VMs from the pool of compute and storage resources, detached VMDK1 and VMDK2 from helper VM 450 and attached them to VM1 and VM2 of live application 580, and started the execution of live application 580.

Figure 6:
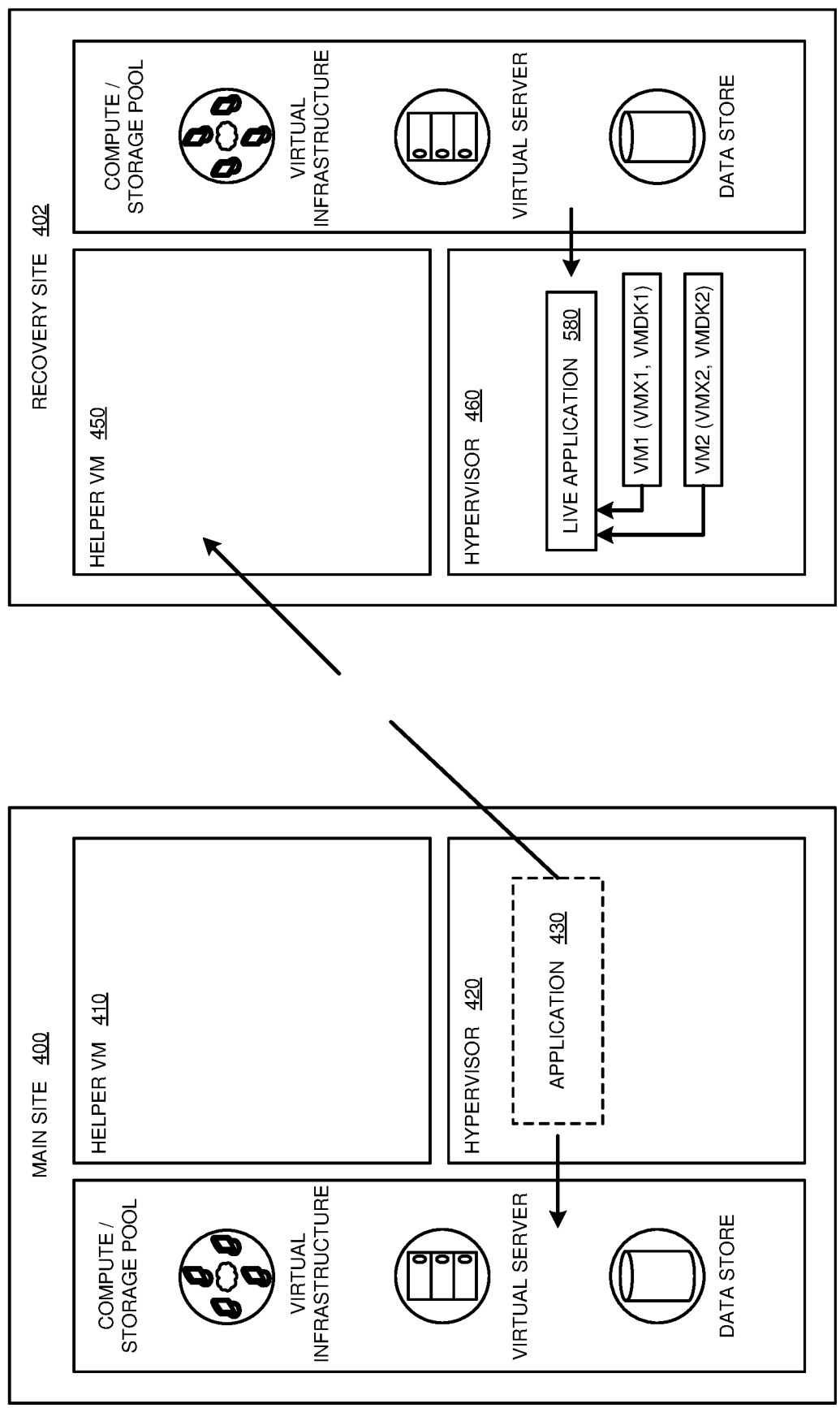
FIG. 6 depicts a continuing example of application recovery using pooled resources in accordance with an illustrative embodiment.

With reference to FIG. 6, this figure depicts a continuing example of application recovery using pooled resources in accordance with an illustrative embodiment. Main site 400, helper VM 410, hypervisor 420, application 430, recovery site 402, helper VM 450, hypervisor 460, and live application 580 are the same as main site 400, helper VM 410, hypervisor 420, live application 430, recovery site 402, helper VM 450, hypervisor 460, and live application 580 in FIG. 5. The example can be implemented using application 300 in FIG. 3.

FIG. 6 depicts main site 400 and recovery site 402 reacting to live application 580's being available to serve client requests. As a result, application 430 no longer executes in hypervisor 420, and resources formerly used by application 430 have been released to the common compute and storage pool.

Figure 7:
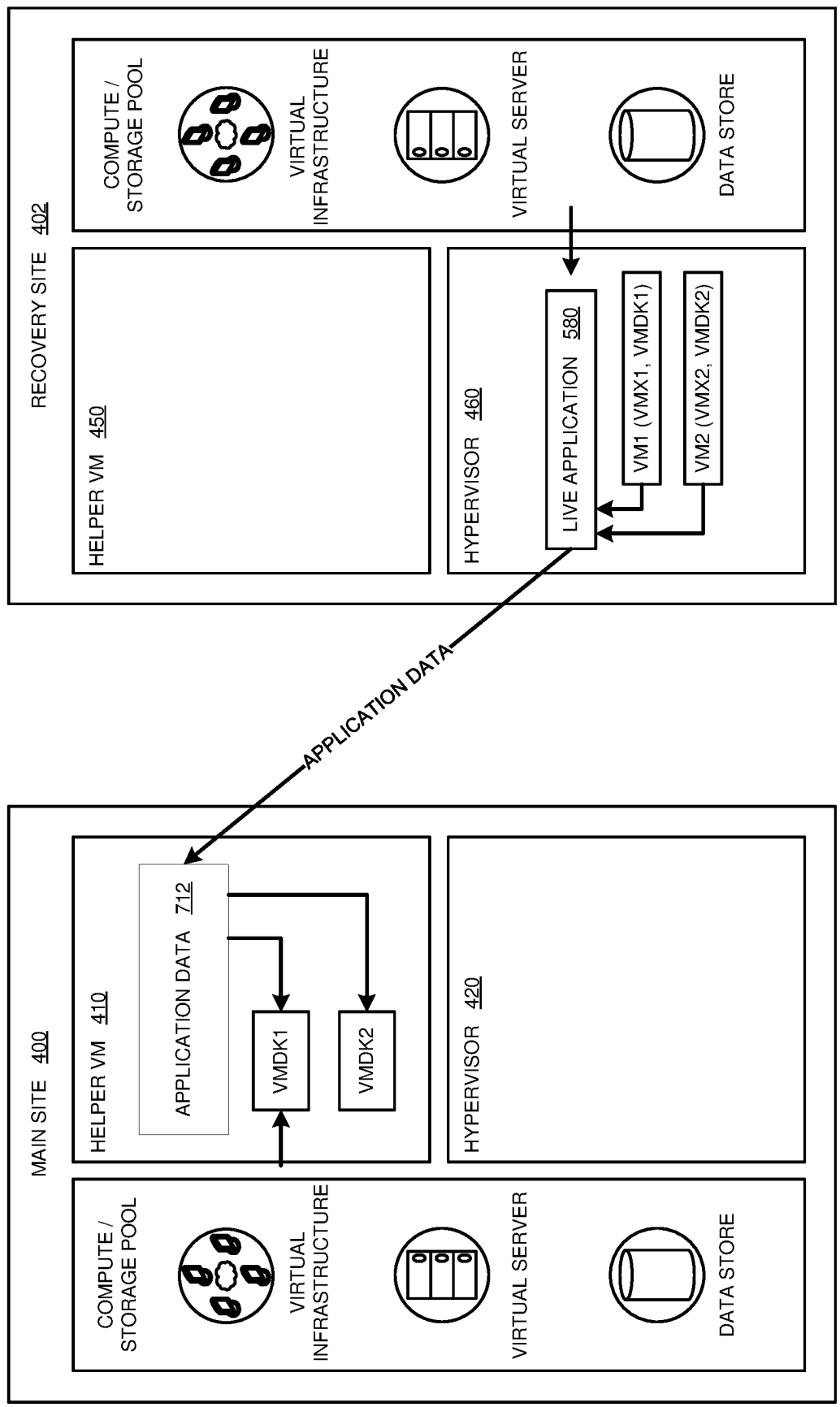
FIG. 7 depicts a continuing example of application recovery using pooled resources in accordance with an illustrative embodiment.

With reference to FIG. 7, this figure depicts a continuing example of application recovery using pooled resources in accordance with an illustrative embodiment. Main site 400, helper VM 410, hypervisor 420, recovery site 402, helper VM 450, hypervisor 460, and live application 580 are the same as main site 400, helper VM 410, hypervisor 420, recovery site 402, helper VM 450, hypervisor 460, and live application 580 in FIG. 6. The example can be implemented using application 300 in FIG. 3.

FIG. 7 depicts main site 400 and recovery site 402 preparing for a switchback operation, after main site 400 has been restored from a disruption. As shown, hypervisor 460 sends application data of live application 580 to helper VM 410 on main site 400. Helper VM 410 stores application data 712. In particular, helper VM 410 is attached to both VMDK1 and VMDK2, the virtual disk files duplicated from those of live application 580.

Figure 8:
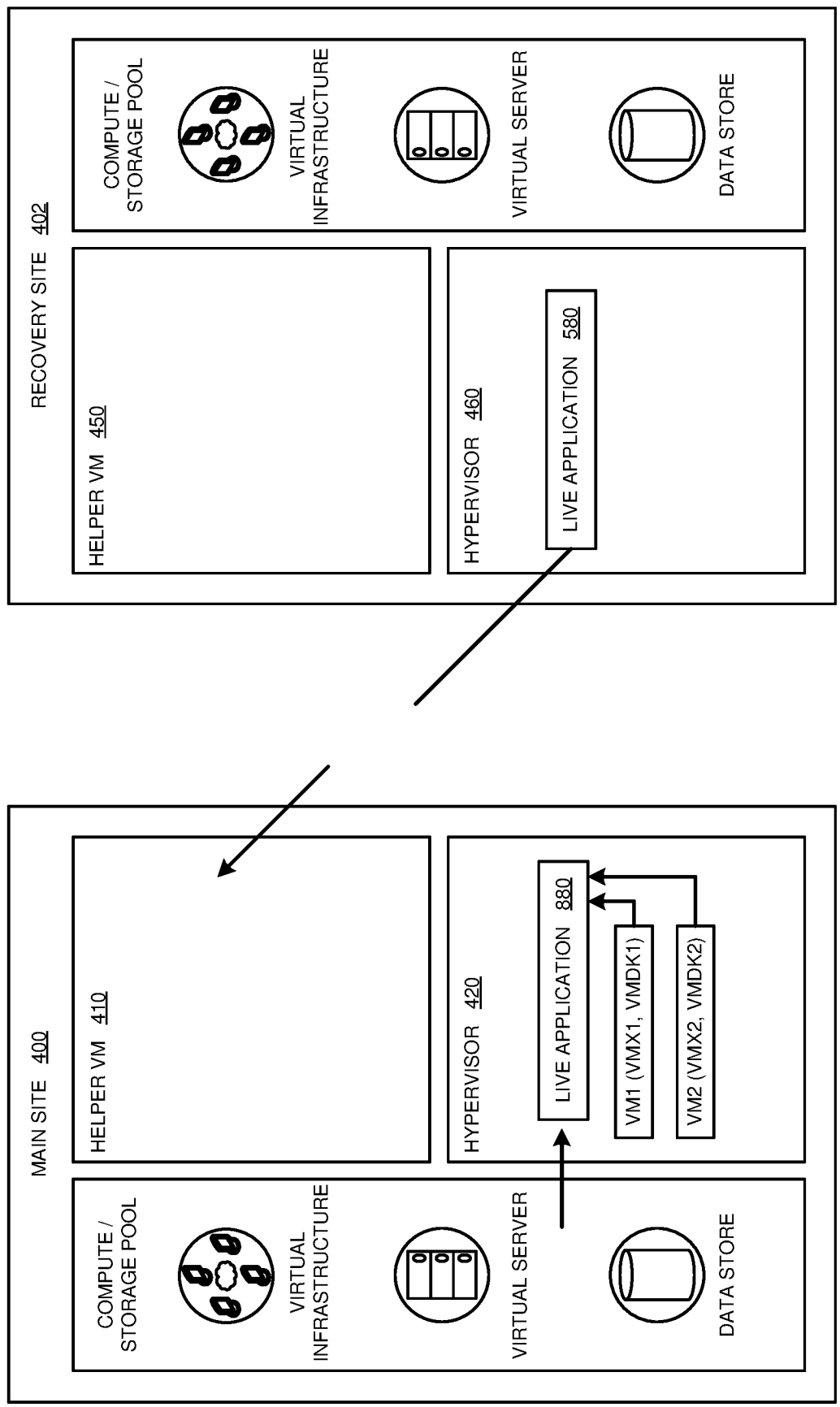
FIG. 8 depicts a continuing example of application recovery using pooled resources in accordance with an illustrative embodiment.

With reference to FIG. 8, this figure depicts a continuing example of application recovery using pooled resources in accordance with an illustrative embodiment. Main site 400, helper VM 410, hypervisor 420, recovery site 402, helper VM 450, hypervisor 460, and live application 580 are the same as main site 400, helper VM 410, hypervisor 420, recovery site 402, helper VM 450, hypervisor 460, and live application 580 in FIG. 7. The example can be implemented using application 300 in FIG. 3.

FIG. 8 depicts main site 400 and recovery site 402 after the switchback operation. The flow of application data from recovery site 402 to main site 400 has been interrupted, although live application 580 may still be executing. Consequently, hypervisor 420 has spawned two VMs from the pool of compute and storage resources, detached VMDK1 and VMDK2 from helper VM 410 and attached them to VM1 and VM2 of live application 880, and started the execution of live application 880.

Figure 9:
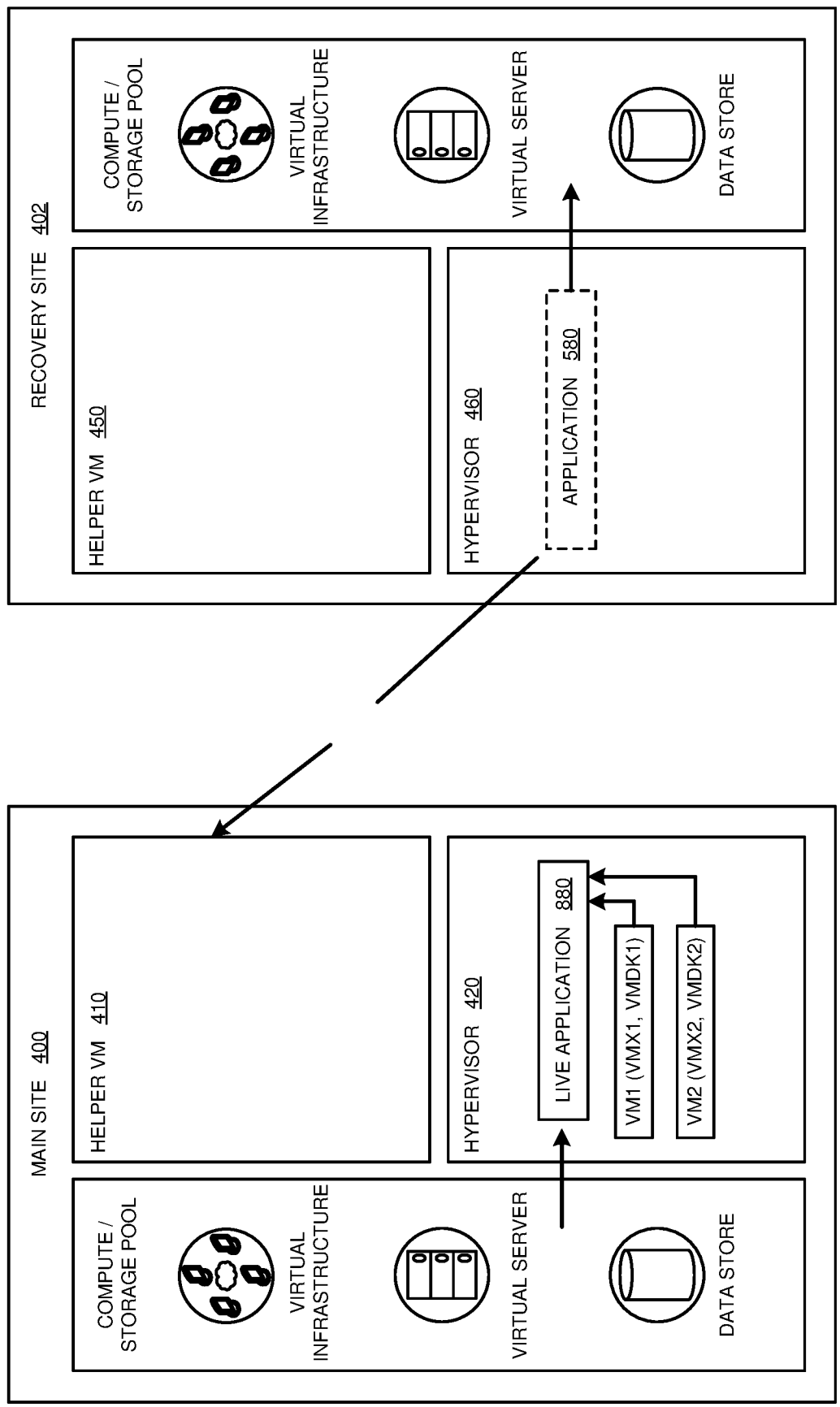
FIG. 9 depicts a continuing example of application recovery using pooled resources in accordance with an illustrative embodiment.

With reference to FIG. 9, this figure depicts a continuing example of application recovery using pooled resources in accordance with an illustrative embodiment. Main site 400, helper VM 410, hypervisor 420, recovery site 402, helper VM 450, hypervisor 460, application 580, and live application 880 are the same as main site 400, helper VM 410, hypervisor 420, recovery site 402, helper VM 450, hypervisor 460, live application 580, and live application 880 in FIG. 8. The example can be implemented using application 300 in FIG. 3.

FIG. 9 depicts main site 400 and recovery site 402 reacting to live application 880's being available to serve client requests. As a result, application 580 no longer executes in hypervisor 460, and resources formerly used by application 580 have been released to the common compute and storage pool.

Figure 10:
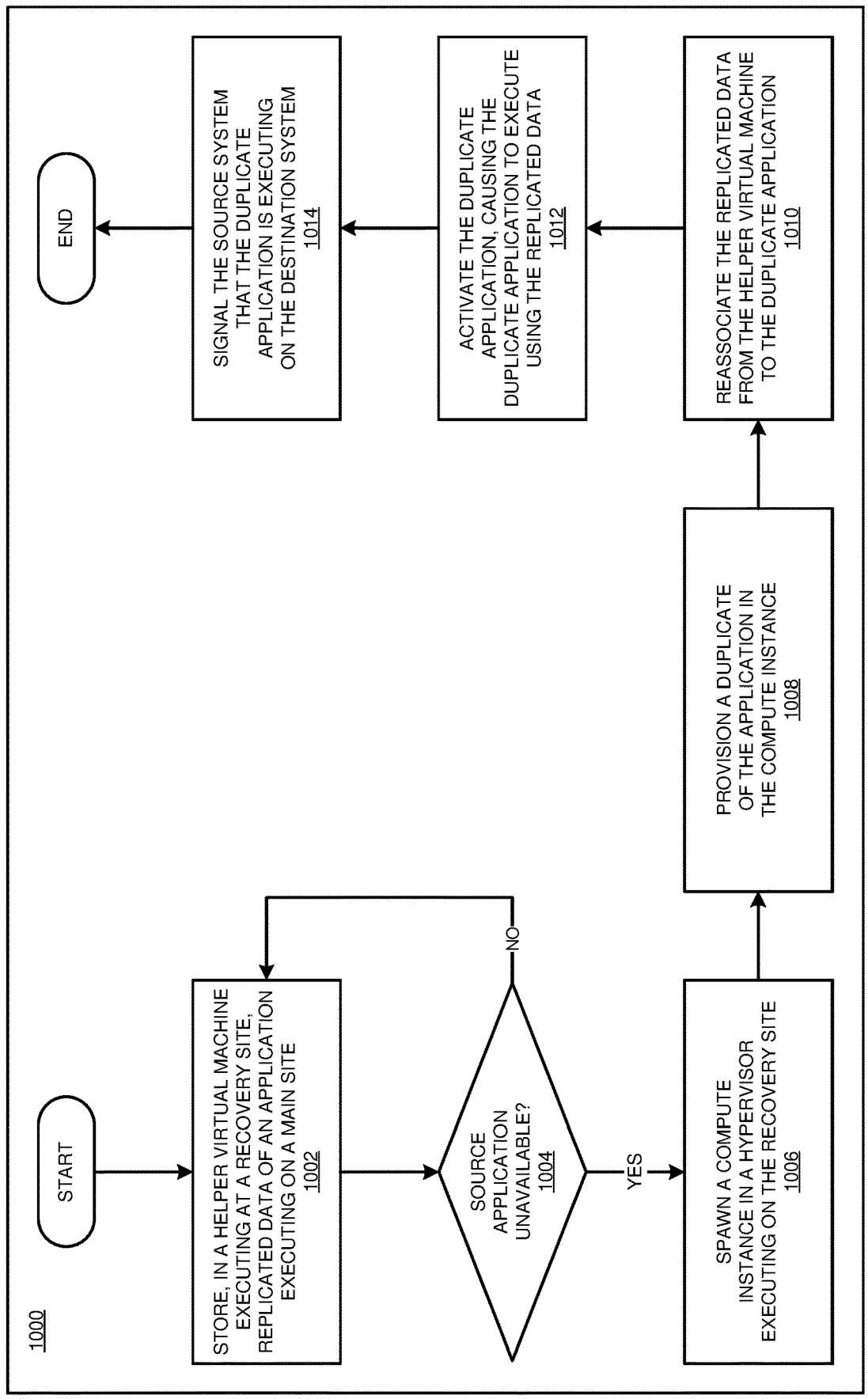
FIG. 10 depicts a flowchart of an example process for application recovery using pooled resources in accordance with an illustrative embodiment.

With reference to FIG. 10, this figure depicts a flowchart of an example process for application recovery using pooled resources in accordance with an illustrative embodiment. Process 1000 can be implemented in application 300 in FIG. 3 and executes at a recovery site.

In block 1002, the application stores, in a helper virtual machine executing at a recovery site, replicated data of a transitioning application executing on a main site. In block 1004, the application checks whether the source application has become unavailable. If not ("NO" path of block 1004), the application returns to block 1002. If yes ("YES" path of block 1004), in block 1006 the application spawns a compute instance in a hypervisor executing on the recovery site. In block 1008, the application provisions a duplicate of the transitioning application in the compute instance. In block 1010, the application reassociates the replicated data from the helper virtual machine to the duplicate transitioning application. In block 1012, the application activates the duplicate application, causing the duplicate application to execute using the replicated data. In block 1012, the application signals the source system that the duplicate application is executing on the destination system. Then the application ends.

Figure 11:
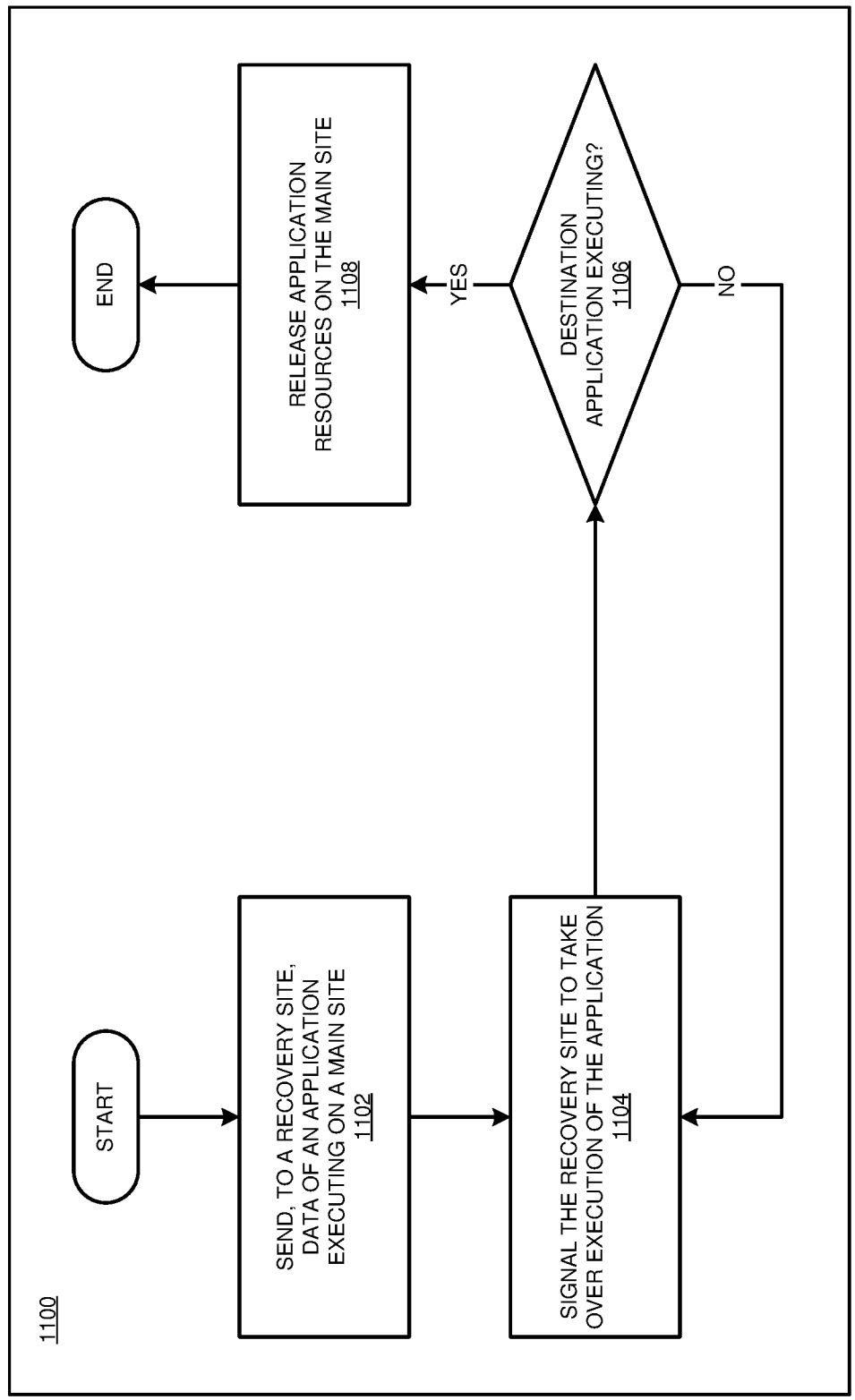
FIG. 11 depicts a flowchart of another example process for application recovery using pooled resources in accordance with an illustrative embodiment.

With reference to FIG. 11, this figure depicts a flowchart of another example process for application recovery using pooled resources in accordance with an illustrative embodiment. Process 1100 can be implemented in application 300 in FIG. 3 and executes at a main site.

In block 1102, the application sends, to a recovery site, data of a transitioning application currently executing on a main site. In block 1104, the application signals the recovery site to take over execution of the transitioning application. In block 1106, the application waits for a signal that the destination application is executing. When the signal is received ("YES" path of block 1106), in block 1108 the application releases application resources formerly used by the transitioning application on the main site.

Thus, a computer implemented method, system or apparatus, and computer program product are provided in the illustrative embodiments for application recovery using pooled resources and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
storing, in a first virtual storage device managed by a helper virtual machine, first data of one or more applications, the one or more applications executing in supported main site virtual machines on a main site physical system, the helper virtual machine executing on a helper physical system, the helper physical system physically separated from the main site physical system, the first data comprising respective virtual machine configuration files of the supported main site virtual machines and data the one or more applications reads from and writes to a virtual storage device managed by the supported main site virtual machines, wherein the helper virtual machine is a single helper virtual machine that supports the one or more applications;
spawning, responsive to determining that a duplicate of the one or more applications should be activated on a physical recovery system, a compute instance in a hypervisor executing on the physical recovery system, the compute instance comprising a recovery virtual machine, the recovery virtual machine configured using the respective virtual machine configuration files of the supported main site virtual machines;
provisioning, in the compute instance, one or more respective duplicates of the one or more applications;
reassociating the first data from the helper virtual machine to the provisioned one or more respective duplicate applications;
activating the provisioned one or more respective duplicate applications, the activating causing the provi- sioned one or more respective duplicate applications to execute on the physical recovery system using the first data; and sending respective signals to the supported main site virtual machines that the provisioned one or more respective duplicate applications are executing on the physical recovery system.

2. The method of claim 1, further comprising:
storing, in the first virtual storage device, second data of the one or more applications, the one or more applications executing on a second system.

3. The method of claim 1, wherein the helper physical system is the physical recovery system.

4. The method of claim 1, wherein the helper physical system is a companion system different from the physical recovery system.

5. The method of claim 1, further comprising:
sending, to a third system, third data of the one or more applications, the one or more applications executing on the physical recovery system.

6. The method of claim 1, further comprising:
releasing, responsive to a signal that the one or more applications has been relocated from the physical recovery system to a third system, resources used by the one or more applications on the physical recovery system.

7. The method of claim 1, wherein determining that the duplicate of the one or more applications should be activated on the physical recovery system comprises:
receiving, from the main site physical system, a communication that there is a disruption affecting the one or more applications.

8. The method of claim 1, wherein determining that the duplicate of the one or more applications should be activated on the physical recovery system comprises:
determining that no data of the one or more applications has been received for a time period above a threshold time.

9. The method of claim 1, wherein the provisioning uses application configuration data managed by the helper virtual machine.

10. A computer usable program product comprising one or more computer-readable storage media, and program instructions stored on at least one of the one or more computer-readable storage media, the stored program instructions comprising:
program instructions to store, in a first virtual storage device managed by a helper virtual machine, first data of one or more applications, the one or more applications executing in supported main site virtual machines on a main site physical system, the helper virtual machine executing on a helper physical system, the helper physical system physically separated from the main site physical system, the first data comprising respective virtual machine configuration files of the supported main site virtual machines and data the one or more applications reads from and writes to a virtual storage device managed by the supported main site virtual machines;
program instructions to spawn, responsive to determining that a duplicate of the one or more applications should be activated on a physical recovery system, a compute instance in a hypervisor executing on the physical recovery system, the compute instance comprising a recovery virtual machine, the recovery virtual machine configured using the respective virtual machine configuration files of the supported main site virtual machines, wherein the helper virtual machine is a single helper virtual machine that supports the one or more applications;
program instructions to provision, in the compute instance, one or more respective duplicates of the one more applications;
program instructions to re-associate the first data from the helper virtual machine to the provisioned one or more respective duplicate applications;
program instructions to activate the provisioned one or more respective duplicate applications, the activating causing the provisioned one or more respective duplicate applications to execute on the physical recovery system using the first data; and
sending respective signals to the supported main site virtual machines that the provisioned one or more respective duplicate applications are executing on the physical recovery system.

11. The computer usable program product of claim 10, further comprising:
program instructions to store, in the first virtual storage device, second data of the one or more applications, the one or more applications executing on a second system.

12. The computer usable program product of claim 10, wherein the helper physical system is the physical recovery system.

13. The computer usable program product of claim 10, wherein the helper physical system is a companion system different from the physical recovery system.

14. The computer usable program product of claim 10, further comprising:
program instructions to send, to a third system, third data of the one or more applications, the one or more applications executing on the physical recovery system.

15. The computer usable program product of claim 10, further comprising:
program instructions to release, responsive to a signal that the one or more applications has been relocated from the physical recovery system to a third system, resources used by one or more applications on the physical recovery system.

16. The computer usable program product of claim 10, wherein determining that the duplicate of the one or more applications should be activated on the physical recovery system comprises:
program instructions to receive, from the main site physical system, a communication that there is a disruption affecting the one or more applications.

17. The computer usable program product of claim 10, wherein determining that the duplicate of the one or more applications should be activated on the physical recovery system comprises:
program instructions to determine that no data of the one or more applications has been received for a time period above a threshold time.

18. The computer usable program product of claim 10, wherein the stored program instructions are stored in a computer readable storage device in a data processing system, and wherein the stored program instructions are is transferred over a network from a remote data processing system.

19. The computer usable program product of claim 10, wherein the stored program instructions are stored in a computer readable storage device in a server data processing system, and wherein the stored program instructions are is downloaded over a network to a remote data processing system for use in a computer readable storage device associated with the remote data processing system.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to store, in a first virtual storage device managed by a helper virtual machine, first data of one or more applications, the one or more applications executing in supported main site virtual machines on a main site physical system, the helper virtual machine executing on a helper physical system, the helper physical system physically separated from the main site physical system, the first data comprising respective virtual machine configuration files of the supported main site virtual machines and data the one or more applications reads from and writes to a virtual storage device managed by the supported main site virtual machines, wherein the helper virtual machine is a single helper virtual machine that supports the one or more applications;

program instructions to spawn, responsive to determining that a duplicate of the one or more applications should be activated on a physical recovery system, a compute instance in a hypervisor executing on the physical recovery system, the compute instance comprising a recovery virtual machine, the recovery virtual machine configured using the respective virtual machine configuration files of the supported main site virtual machines;

program instructions to provision, in the compute instance, one or more respective duplicates of the one or more applications;

program instructions to re-associate the first data from the helper virtual machine to the provisioned one or more respective duplicate applications;

program instructions to activate the provisioned one or more respective duplicate applications, the activating causing the provisioned one or more respective duplicate applications to execute on the physical recovery system using the first data; and sending respective signals to the supported main site virtual machines that the provisioned one or more respective duplicate applications are executing on the physical recovery system.

* * * * *